H. V. HARDMAN.
SHAVING BRUSH.
APPLICATION FILED NOV. 16, 1910.

1,001,757.

Patented Aug. 29, 1911.

Witnesses

Inventor
Herbert V. Hardman,
per Fred L. Casker,
Atty.

COLUMBIA PLANOGRAPH CO., WASHINGTON, D. C.

UNITED STATES PATENT OFFICE.

HERBERT V. HARDMAN, OF BELLEVILLE, NEW JERSEY.

SHAVING-BRUSH.

1,001,757.      Specification of Letters Patent.     Patented Aug. 29, 1911.

Application filed November 16, 1910. Serial No. 592,624.

*To all whom it may concern:*

Be it known that I, HERBERT V. HARDMAN, a citizen of the United States of America, residing at Belleville, in the county of Essex and State of New Jersey, have invented certain new and useful Improvements in Shaving-Brushes, of which the following is a specification, reference being had therein to the accompanying drawing.

My present invention relates to a new and useful shaving brush and it is also applicable to brushes used for other purposes.

The object of the invention is to secure a simple and efficient combination of the handle, the bristle knot and other parts.

The invention consists essentially in the details of construction, combination and arrangement substantially as will be hereinafter described and claimed.

Figure 1:
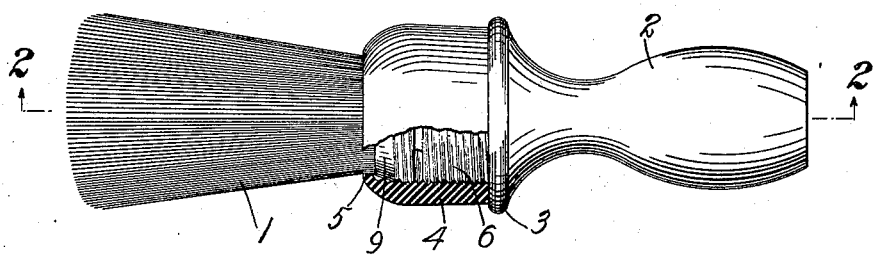
Figure 2:
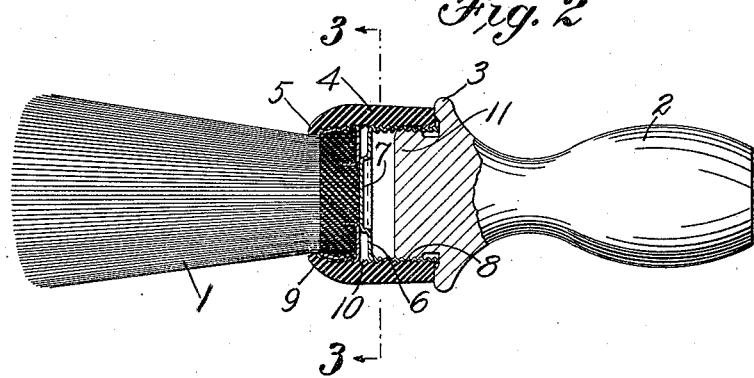
Figure 3:
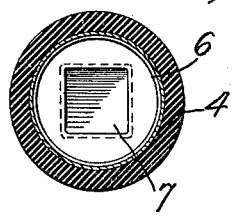

In the accompanying drawing illustrating my invention, Figure 1 is a side elevation of my improved shaving brush with a portion broken away to expose the interior construction. Fig. 2 is a sectional view on line 2—2 of Fig. 1 with certain parts in elevation. Fig. 3 is a cross section on the line 3—3 of Fig. 2.

Similar characters of reference designate corresponding parts in the different figures.

1 designates the bristle knot which is of the usual formation, made of any size and shape, and of any suitable bristles. This is vulcanized into a threaded ferrule 9, there being as many screw threads thereon as may be found necessary, but usually only a few.

2 indicates the handle of the brush and 4 the outside ferrule or main connection between the bristle knot and the handle. This main ferrule 4 is of a substantial construction and is interiorly threaded from one end to the other. It is sleeve-like in form and the interior diameter nearest to the knot 1 contracts to a taper edge at 5. In assembling the parts it will be observed that the knot 1 is passed entirely through the ferrule 4 and caused to project from the tapered end 5 of said ferrule, and the threaded ferrule 9 on the vulcanized end of the knot 1 will be screwed through the ferrule 4 in engagement with the interior threads 10 thereof, and caused to sink itself tightly and firmly in the tapered end 5 of the ferrule 4 as shown in Fig. 2, the threads 10 and 9 being still in engagement when the screwing action is completed.

6 designates a jam ferrule which is a hollow sleeve with one end closed and the other open, and is threaded from end to end at 8, the threads being spun on the ferrule so that the same is threaded inside exactly the same as it is threaded outside. This ferrule 6 screws into the outer ferrule 4, and the threads 8 in such screwing action obviously engage with the interior threads 10 of ferrule 4. The closed end of the jam ferrule 6 is provided with a square or other angular indent or recess 7 for the purpose of enabling a key to be used in the bottom of this ferrule by means of which it can be screwed more tightly into the outer ferrule 4 and down and against the bristle knot.

In the process of assembling the various parts it is to be noted that after the bristle knot has been securely fixed in place by screwing the ferrule 9 tightly down into the contracted end 5 of ferrule 4, the jam ferrule 6 will then be screwed into ferrule 4 until it jams tight against the top of the bristle knot, thereby having the same effect as any ordinary jam nut designed to prevent twisting or loosening. After these parts have been properly related to each other as explained, the wooden handle 2, having thereon the flange 3, is screwed into the jam ferrule 6 until the flange 3 seats itself tightly against the adjacent edge of the outer ferrule 4. This handle 2 has a screw threaded portion 11 whose external threads engage the internal threads on the jam ferrule 6, as indicated in Fig. 3. It is not essential that the end of the wooden handle 2 should reach the bottom of the jam ferrule 6 because, as already stated, the wooden shoulder 3 tightens itself on the outer edge of the ferrule 4.

In the case of handles already well known, where pitch, rosin or some similar substance is used to fill the space between the end of the handle and the top of the bristle ferrule, it often happens that when the brush is subjected to heat, as in sterilizing, the material melts and the parts of the brush loosen and fall apart. In my construction, however, the handle is not essential in any way for the firm holding of the bristle knot in place. A common danger where a wooden handle is used is that its continual use in water swells it immensely and in many cases bursts the outside and connecting ferrule. My construction, however, prevents this. The wooden handle is screwed into the steel jam ferrule which is sufficiently strong to resist swelling.

Having thus described my invention, what I claim as new and desire to obtain by Letters Patent is:—

1. In a brush, the combination of the knot, a ferrule having an interior screw thread and tapering toward one end, a jam ferrule within the latter ferrule and screwed down upon the knot, and a handle which screws into the jam ferrule.

2. In a brush for shaving and other purposes, the combination of a knot having a threaded ferrule, and an interiorly-threaded ferrule which receives the knot ferrule, a jam ferrule screwed into the latter ferrule against the knot, and a handle screwed into the jam ferrule.

3. In a brush, the combination of a knot having a threaded ferrule, an interiorly threaded outer ferrule which receives the knot ferrule, a threaded jam ferrule having a central angular indent therein that contacts with the knot when the parts are in position and which serves for the application of a device for screwing the jam ferrule tightly into place, and a handle screwed into the jam ferrule.

In testimony whereof I affix my signature in presence of two witnesses.

HERBERT V. HARDMAN.

Witnesses:
  THEO. L. BROME,
  MARY C. SALMON.

---

Copies of this patent may be obtained for five cents each, by addressing the "Commissioner of Patents, Washington, D. C."